(12) United States Patent
Sun et al.

(10) Patent No.: US 12,235,488 B2
(45) Date of Patent: Feb. 25, 2025

(54) BACKLIGHT MODULE AND DISPLAY APPARATUS

(71) Applicants: Beijing BOE Display Technology Co., Ltd., Beijing (CN); BOE TECHNOLOGY GROUP CO., LTD., Beijing (CN)

(72) Inventors: Hanyan Sun, Beijing (CN); Minghui Zhang, Beijing (CN); Hui Zheng, Beijing (CN)

(73) Assignees: Beijing BOE Display Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 58 days.

(21) Appl. No.: 17/907,867

(22) PCT Filed: Oct. 20, 2021

(86) PCT No.: PCT/CN2021/124926
§ 371 (c)(1),
(2) Date: Aug. 29, 2022

(87) PCT Pub. No.: WO2022/100386
PCT Pub. Date: May 19, 2022

(65) Prior Publication Data
US 2023/0130661 A1 Apr. 27, 2023

(30) Foreign Application Priority Data
Nov. 10, 2020 (CN) .......................... 202011246186.0

(51) Int. Cl.
*F21V 8/00* (2006.01)

(52) U.S. Cl.
CPC .................................. *G02B 6/0088* (2013.01)

(58) Field of Classification Search
CPC ......... G02F 1/133308; G02F 1/133314; G02F 1/133317; G02F 1/133608; G02F 2201/46; G02F 2201/50
See application file for complete search history.

(56) References Cited

U.S. PATENT DOCUMENTS 9,798,069 B2    10/2017  Horiguchi
10,423,020 B2    9/2019  Sun et al.
(Continued)

FOREIGN PATENT DOCUMENTS

CN    201983111 A    9/2011
CN    102628566 A    8/2012
(Continued)

*Primary Examiner* — William J Carter
(74) *Attorney, Agent, or Firm* — HOUTTEMAN LAW LLC (57) ABSTRACT

A backlight module and a display apparatus are provided. The backlight module includes a backplane including a bottom wall and a side wall connected to define an accommodating portion; a light guide plate in the accommodating portion; an optical film on a side of the light guide plate away from the bottom wall; and a plastic frame including a retaining wall and a bearing portion, the retaining wall is arranged side by side with the side wall on a side of the side wall away from the light guide plate; the bearing portion is connected to the retaining wall on a side of the side wall and the optical film away from the bottom wall; the bearing portion includes a first surface away from the side wall and opposite to the retaining wall; at least a portion of the first surface protrudes towards a side close to the retaining wall.

16 Claims, 5 Drawing Sheets

(56) References Cited

U.S. PATENT DOCUMENTS

| | | | |
|---|---|---|---|
| 10,557,985 B2 | 2/2020 | Chen et al. | |
| 2007/0064448 A1 | 3/2007 | Yu et al. | |
| 2016/0245982 A1 | 8/2016 | Horiguchi | |
| 2017/0192148 A1* | 7/2017 | Shang | G02B 6/0088 |
| 2021/0208456 A1 | 7/2021 | Xu et al. | |

FOREIGN PATENT DOCUMENTS

| | | | |
|---|---|---|---|
| CN | 102748658 A | 10/2012 | |
| CN | 103486480 A | 1/2014 | |
| CN | 203705745 A | 7/2014 | |
| CN | 105446007 A | 3/2016 | |
| CN | 205067925 U | 3/2016 | |
| CN | 205334013 U | 6/2016 | |
| CN | 105842919 A | 8/2016 | |
| CN | 106773326 A | 5/2017 | |
| CN | 106940460 A | 7/2017 | |
| CN | 206531989 A | 9/2017 | |
| CN | 207586588 A | 7/2018 | |
| CN | 210244008 A | 4/2020 | |
| CN | 214278577 U | 9/2021 | |
| JP | 2013068869 A | 4/2013 | |
| TW | 200712664 A | 4/2007 | |
| WO | WO2014015541 A1 | 1/2014 | |
| WO | WO2015079485 A1 | 6/2015 | |
| WO | WO2016192129 A1 | 12/2016 | |
| WO | WO-2019201206 A1 * | 10/2019 | G02F 1/133308 |

* cited by examiner

BACKLIGHT MODULE AND DISPLAY APPARATUS

TECHNICAL FIELD

The present disclosure belongs to the field of display technology, and in particular to a backlight module and a display apparatus.

BACKGROUND

In the liquid crystal display field, a main function of a backlight module is to provide an even illuminant having a high luminance for a liquid crystal display panel. The basic principle is to convert a common linear or point illuminant into an evenly distributed surface illuminant having a high luminance through an effective light mechanism, so that the liquid crystal display panel can display images. The backlight module is one of key components of a liquid crystal display apparatus, and the light-emitting effect of the backlight module directly influences the visual effect of the liquid crystal display panel. With the development of the technology and the improvement of the appearance requirements of consumers, the conventional backlight module with a front frame and a rear cover cannot meet the requirements of high-end consumers. In order to meet the higher demand of consumers, an ultra-thin display having a narrow border is gradually developed. A structure of the backlight module directly affects a width and a thickness of the frame of the display, and therefore, the focus is on improving the structure of the backlight module.

SUMMARY

The present disclosure intends to solve at least one of the technical problems of the prior art, and provides a backlight module and a display apparatus.

In a first aspect, an embodiment of the present disclosure provides a backlight module, including:
- a backplane including a bottom wall and a side wall; wherein the bottom wall and the side wall are connected to each other to define an accommodating portion of the backplane;
- a light guide plate in the accommodating portion;
- an optical film on a side of the light guide plate away from the bottom wall;
- a plastic frame including a retaining wall and a bearing portion; wherein the retaining wall is arranged side by side with the side wall and on a side of the side wall away from the light guide plate; the bearing portion is connected to the retaining wall and is on a side of the side wall and the optical film away from the bottom wall; wherein
- the bearing portion includes a first surface away from the side wall and opposite to the retaining wall; at least a portion of the first surface protrudes towards a side close to the retaining wall.

The at least a portion of the first surface includes a first sub-surface and a second sub-surface opposite to the retaining wall, and a first connection sub-surface connecting the first sub-surface and the second sub-surface together; and
the first sub-surface and the second sub-surface are sequentially arranged in a direction away from the optical film, and a farthest distance between the first sub-surface and the retaining wall is different from a farthest distance between the second sub-surface and the retaining wall.

A width of the first sub-surface is less than a width of the second sub-surface in the direction away from the optical film.

The farthest distance between the first sub-surface and the retaining wall is greater than the farthest distance between the second sub-surface and the retaining wall.

The first sub-surface is substantially parallel to the second sub-surface.

The at least a portion of the first surface includes a first sub-surface, a second sub-surface, a third sub-surface opposite to the retaining wall, a first connection sub-surface connecting the first sub-surface and the second sub-surface together, and a second connection sub-surface connecting the second sub-surface and the third sub-surface together;
the first sub-surface, the second sub-surface, and the third sub-surface are sequentially arranged in a direction away from the optical film; and a farthest distance between the first sub-surface and the retaining wall, a farthest distance between the second sub-surface and the retaining wall, and a farthest distance between the third sub-surface and the retaining wall are different from each other.

At least one of the farthest distance between the first sub-surface and the retaining wall and the farthest distance between the third sub-surface and the retaining wall is greater than the farthest distance between the second sub-surface and the retaining wall.

At least one of the first and third sub-surfaces has a width less than a width of the second sub-surface in the direction away from the optical film.

The first, second and third sub-surfaces are substantially parallel to each other.

The first surface has a height of not less than 0.8 mm in the direction away from the optical film.

The bearing portion includes a second surface opposite to the optical film, and an extending surface of the second surface and a plane where the optical film is located have a dihedral angle therebetween.

The dihedral angle is not greater than 5°.

The first surface includes a matte structure thereon.

The portion of the first surface protruding towards the side close to the retaining wall surrounds in a circumference direction of the first surface.

The portion of the first surface protruding towards the side close to the retaining wall surrounds in a circumference direction of the bearing portion.

The backlight module further includes a reflector in the accommodating portion and on a side of the light guide plate away from the optical film.

The bottom wall has a stiffener thereon; the stiffener has a width in a range of 0.2 mm to 1.5 mm.

The first surface includes at least one of a step surface, a groove surface, a wave surface.

In a second aspect, an embodiment of the present disclosure provides a display apparatus, including the backlight module in any one of the above embodiments, and a display panel disposed on the bearing portion.

The display apparatus includes a display region, and a distance from the retaining wall to a boundary of the display region is not greater than 7 mm.

DETAIL DESCRIPTION OF EMBODIMENTS

In order to make the objects, technical solutions and advantages of the present disclosure more apparent, the present disclosure will be described in further detail with reference to the accompanying drawings. Obviously, the described embodiments are only some, not all, of embodiments of the present disclosure. All other embodiments, which may be obtained by one of ordinary skill in the art without any creative effort based on the embodiments in the present disclosure, belong to the protection scope of the present disclosure.

Shapes and sizes of the components in the drawings are not to scale, but are merely intended to facilitate an understanding of the contents of the embodiments of the present disclosure.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. Further, the term "a", "an", "the", or the like used herein does not denote a limitation of quantity, but rather denotes the presence of at least one element. The term "comprising", "including", or the like, means that the element or item preceding the term contains the element or item listed after the term and its equivalent, but does not exclude other elements or items. The term "connected", "coupled", or the like is not limited to physical or mechanical connections, but may include electrical connections, whether direct or indirect connections. The terms "upper", "lower", "left", "right", and the like are used only for indicating relative positional relationships, and when the absolute position of an object being described is changed, the relative positional relationships may also be changed accordingly.

Figure 1:
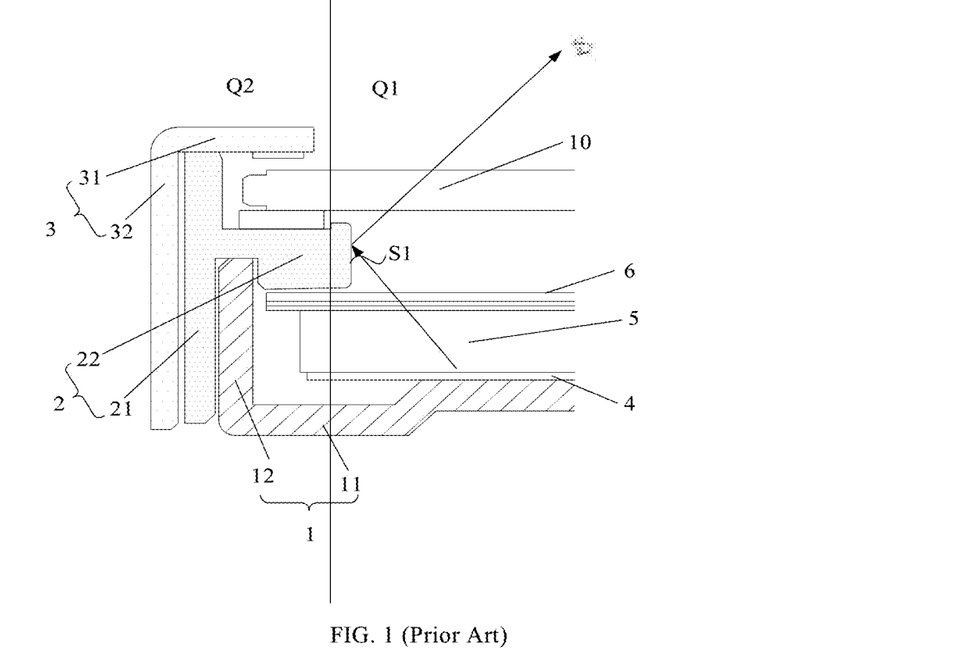
FIG. 1 is a schematic diagram of a structure of an exemplary display apparatus.

FIG. 1 is a schematic diagram of a structure of an exemplary display apparatus. As shown in FIG. 1, the display apparatus includes a display region Q1 and a peripheral region Q2 surrounding the display region Q1; the display apparatus includes a backlight module and a display panel 10 positioned on a light outgoing surface of the backlight module. The display panel 10 may include a first substrate and a second substrate disposed opposite to each other, and a liquid crystal layer formed between the first substrate and the second substrate. The first substrate includes, but is not limited to, an array substrate, and the second substrate includes, but is not limited to, a color filter substrate. The backlight module includes a backplane 1, a plastic frame 2, an outer frame 3, a light guide plate 5, a light source component, an optical film 6, a reflector 4 and the like. The backplane 1 includes a bottom wall 11 and a side wall 12, which are connected together to define an accommodating portion in which the reflector 4, the light guide plate 5 and the optical film 6 are disposed sequentially in a direction away from the bottom wall 11. The light source component may be an LED light bar disposed on the side wall 12 of the backplane 1 and opposite to at least one side of the light guide plate 5. The plastic frame 2 includes a retaining wall 21 and a bearing portion 22; the retaining wall 21 is arranged side by side with the side wall 12 of the backplane 1, and the bearing portion 22 is connected to the retaining wall 21 and is positioned on a side of the side wall 12 of the backplane 1 and the optical film 6, away from the bottom wall 11 of the backplane 1; the bearing portion 22 of the plastic frame 2 is used for bearing (supporting) the display panel 10. The outer frame 3 is disposed outside the plastic frame 2 and the display panel 10 for fixing the plastic frame 2 and the display panel 10 together.

Figure 2:
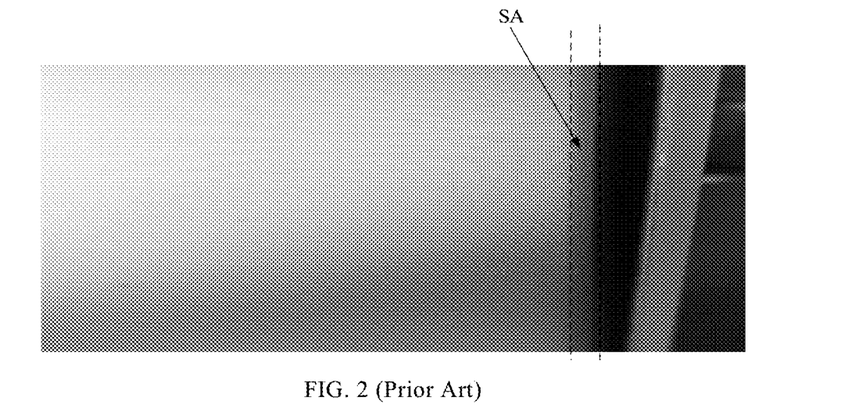
FIG. 2 is a schematic diagram of a dark shadow of the display apparatus shown in FIG. 1.

The inventor has found that with a border of the display apparatus becoming narrower and narrower, a distance from an outer edge of the plastic frame 2 to the display region Q1 of the display apparatus is reduced. In this case, after the light emitted through the light guide plate 5 is irradiated to a first surface S1 of the bearing portion 22, a part of light exits the display region Q1 and enters human eyes, and a dark shadow is formed at the edge of the display screen, and when this phenomenon becomes serious, a part of pixels in the display region Q1 of the display panel 10 are shielded, and the display of the display apparatus is further affected. FIG. 2 is a schematic diagram of a dark shadow of the display apparatus shown in FIG. 1. As may be seen from FIG. 2, in the display apparatus in the related art, after the light is irradiated to the first surface S1 of the bearing portion 22, a dark shadow occurs at the edge of the display region. It should be noted that FIG. 2 illustrates a shadow appearing on a side of the display apparatus where a printed circuit board is located, and correspondingly the same problem may also occur on other sides of the display panel.

In view of the above problems, the following technical solutions are provided in the embodiments of the present disclosure.

Figure 3:
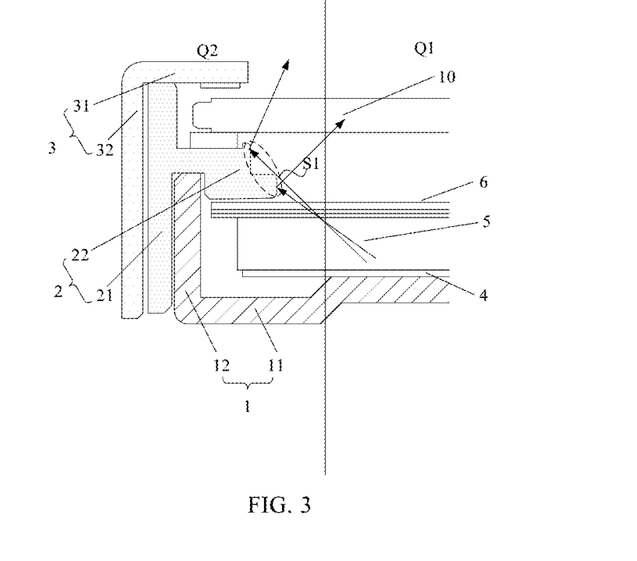
FIG. 3 is a schematic diagram of a structure of a backlight module and a display panel according to an embodiment of the present disclosure.

In the first aspect, FIG. 3 is a schematic diagram of a structure of a backlight module and a display panel 10 according to an embodiment of the present disclosure. As shown in FIG. 3, an embodiment of the present disclosure provides a backlight module, forming a display apparatus in cooperation with the display panel 10. The backlight module may include a backplane 1, a plastic frame 2, a reflector 4, a light guide plate 5, an optical film 6, an LED light bar and the like; wherein the backplane 1 includes a bottom wall 11 and a side wall 12; the bottom wall 11 of the backplane 1 is disposed opposite to the display panel 10, and the side wall 12 extends toward the display panel 10, and is connected to the bottom wall 11, to define an accommodating portion in which the reflector 4, the light guide plate 5 and the optical film 6 are disposed sequentially in a direction away from the bottom wall 11. The plastic frame 2 includes a retaining wall 21 and a bearing portion 22; the retaining wall 21 is arranged side by side with the side wall 12 of the backplane 1, and the bearing portion 22 is connected to the retaining wall 21 and is positioned on a side of the side wall 12 of the backplane 1 and the optical film 6, away from the bottom wall 11 of the backplane 1; the bearing portion 22 includes a first surface S1 opposite to the retaining wall 21 and away from the side wall 12 of the backplane 1. Specifically, in the present embodiment, at least a portion of the first surface S1 of the bearing portion 22 protrudes towards a side close to the retaining wall 21 (hereinafter referred to as a concave portion).

In the embodiment of the present disclosure, at least a portion of the first surface S1 of the bearing portion 22 of the plastic frame 2 of the backlight module protrudes towards the side close to the retaining wall 21, that is, compared to the related art, at least a portion of the first surface S1 may be moved close to a plane where the retaining wall 21 is located, so that an optical path of the light irradiated to the concave position of the first surface S1 is elongated, the intensity of the light is weakened, and the light reflected to the human eye is also reduced, thereby also effectively alleviating the problem of dark shadows.

Referring to FIG. 3, in some embodiments, a maximum distance between the first surface S1 of the bearing portion 22 and the retaining wall 21 is not greater than 7 mm, that is, a maximum width of the plastic frame 2 is not greater than 7 mm, so that the backlight module according to the embodiment of the present disclosure can realize a narrow border. For example, in some products, the maximum distance from the first surface S1 of the bearing portion 22 to the retaining wall 21 is about 6 mm; further, in some products, the maximum distance from the first surface S1 of the bearing portion 22 to the retaining wall 21 is not greater than 5 mm. In an embodiment of the present disclosure, the maximum distance between the first surface S1 of the bearing portion 22 and the retaining wall 21 may be set to be in a range of about 1.0 mm to 1.2 mm, so as to achieve the narrow border as much as possible.

In some embodiments, the portion of the first surface S1 protruding towards the side close to the retaining wall 21 surrounds in a circumference direction, that is, the first surface S1 includes a concave surface protruding towards the side close to the retaining wall 21 in a circle. Therefore, the reflection of the light irradiated to the first surface S1 to human eyes may be reduced as much as possible, and the dark shadow on the display screen in the peripheral region Q2 of the display apparatus may be effectively reduced. As an example, the first surface S1 includes a concave surface protruding towards the side close to the retaining wall 21 for description.

Figure 4:
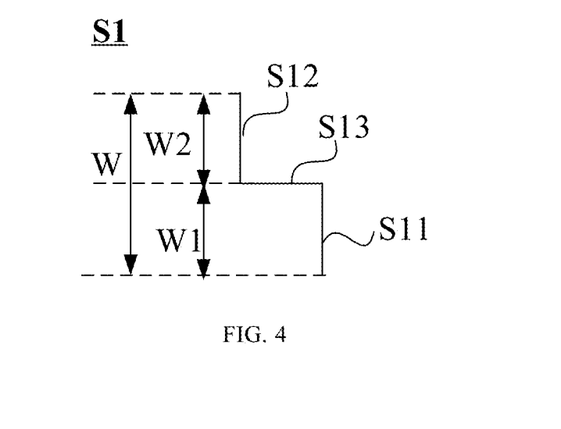
FIG. 4 is a schematic diagram of a first surface according to an embodiment of the present disclosure.
Figure 5:
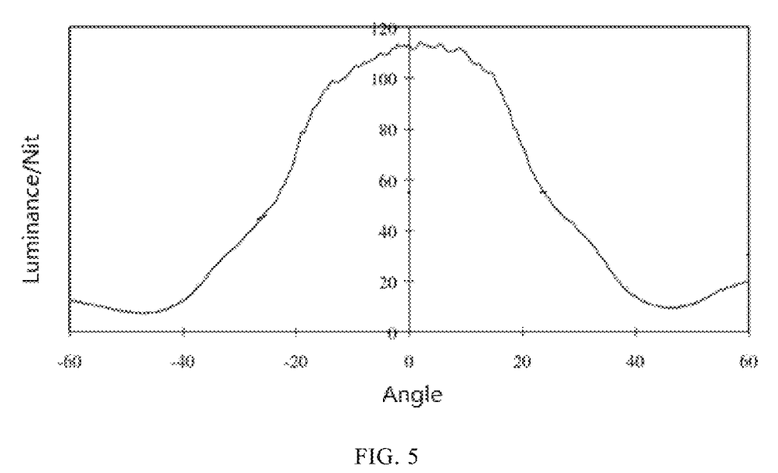
FIG. 5 shows a correspondence between an exit angle of a light and a luminance.
Figure 6:
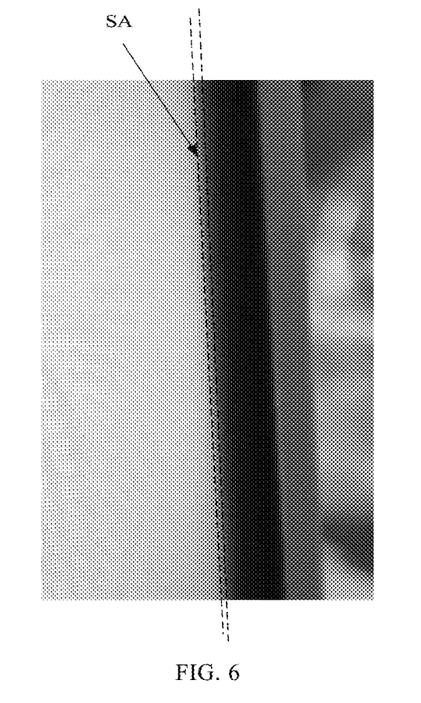
FIG. 6 is a schematic diagram of a dark shadow of a display apparatus adopting the backlight module according to an embodiment of the present disclosure.

In one example, FIG. 4 is a schematic diagram of a first surface S1 according to an embodiment of the present disclosure. As shown in FIGS. 3 and 4, the first surface S1 of the bearing portion 22 of the frame 2 is stepped in a cross section perpendicular to a plane where the optical film 6 is located. As an example, the first surface S1 of the bearing portion 22 has one step in the cross section perpendicular to the plane where the optical film 6 is located for description. Specifically, the first surface S1 of the bearing portion 22 includes a first sub-surface S11 and a second sub-surface S12 disposed opposite to the retaining wall 21, and a first connection sub-surface S13 for connecting the first sub-surface S11 and the second sub-surface S12. The farthest distances from the first sub-surface S11 and the second sub-surface S12 to the retaining wall 21 are different from each other. With continued reference to FIG. 3, the farthest distance from the first sub-surface S11 to the retaining wall 21 is greater than the farthest distance from the second sub-surface S12 to the retaining wall 21. Most of the light emitted through the optical film 6 irradiates onto the second sub-surface S12, and a small portion of the light irradiates onto the first sub-surface S11, since a distance from the second sub-surface S12 to the retaining wall 21 is shortened compared to the conventional design, the optical path of the light irradiated onto the second sub-surface S12 is lengthened and the light intensity is weakened compared to the light irradiated onto the first sub-surface S11. Of the light irradiated onto the second sub-surface S12, the light with a small exit angle from the optical film 6 is reflected to the peripheral region by the second sub-surface S12 and absorbed by a black matrix in the peripheral region; because the light with a large exit angle from the optical film 6 has a relatively low luminance (as shown in FIG. 5, showing a correspondence between the exit angle of the light and the luminance), the optical path of the light irradiated to the second sub-surface S12 is lengthened, so that the light intensity is further weakened, and the luminance is lower and is less noticeable to human eyes. Therefore, the amount and the light intensity of the light irradiated to the bearing portion 22 and reflected to human eyes may be effectively reduced, thereby eliminating and relieving the dark shadows. In addition, as shown in FIG. 4, in a direction away from the optical film 6, a width W1 of the first sub-surface S1 may be less than a width W2 of the second sub-surface S12. In this way, the light irradiated to the bearing portion 22 and reflected to the human eye may also be effectively reduced. FIG. 6 is a schematic diagram of a shadow of a display apparatus adopting the backlight module according to an embodiment of the present disclosure. It may be seen from FIG. 6 that the dark shadow is obviously weakened.

For example: in some embodiments, the width W1 (hereinafter referred to as width) of the first sub-surface S11 in the direction away from the optical film 6 is not less than 0.8 mm. A maximum width W of the first surface S1 of the bearing portion 22 is 2.1 mm, the width W1 of the first sub-surface S11 is 0.9 mm, and the width W2 of the second sub-surface S12 is 1.1 mm; the maximum width W of the first surface S1 of the bearing portion 22 is 2.3 mm, the width W1 of the first sub-surface S11 is 1.1 mm, and the width W2 of the second sub-surface S12 is 1.2 mm. The dark shadow at the edge of the display panel 10 is obviously improved, through verifying the above two sets of data by the inventor.

For example, with continued reference to FIG. 3, in some embodiments, the first sub-surface S11 and the second sub-surface S12 are sequentially disposed in the direction away from the optical film 6, and the farthest distance between the first sub-surface S11 and the retaining wall 21 is greater than the farthest distance between the second sub-surface S12 and the retaining wall 21. The first sub-surface S11 and the second sub-surface S12 may be substantially parallel or parallel to the plane where the retaining wall 21 is located, and the first connection sub-surface S13 is parallel or substantially parallel to the plane where the optical film 6 is located. Alternatively, each of the first sub-surface S11 and the second sub-surface S12 may form an angle with the plane where the retaining wall 21 is located.

Figure 7:
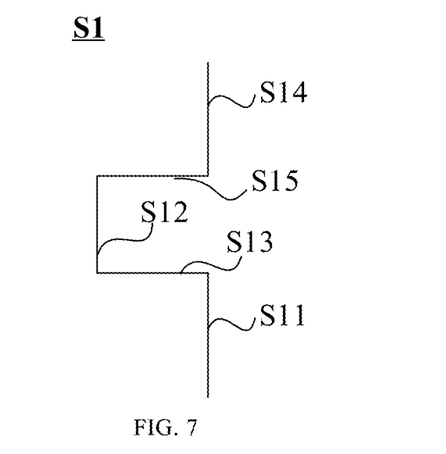
FIG. 7 is a schematic diagram of another first surface according to an embodiment of the present disclosure.

In another example, FIG. 7 is a schematic diagram of another first surface S1 according to an embodiment of the present disclosure. As shown in FIG. 7, the first surface S1 of the bearing portion 22 of the plastic frame 2 is groove-shaped in the cross section perpendicular to the plane where the optical film 6 is located. Specifically, the first surface S1 of the bearing portion 22 includes a first sub-surface S11, a second sub-surface S12, a third sub-surface S14 disposed opposite to the retaining wall 21, a first connection sub-surface S13 for connecting the first sub-surface S1 and the second sub-surface S12, and a second connection sub-surface S15 for connecting the second sub-surface S12 and the third sub-surface S14. The farthest distance from at least one of the first sub-surface S11 and the third sub-surface S14 to the retaining wall 21 is different from the farthest distance between the second sub-surface S12 and the retaining wall 21. For example: the farthest distances from the first sub-surface S11 and the third sub-surface S14 to the retaining wall 21 are equal to each other, and the farthest distance from the first sub-surface S11 or the third sub-surface S14 to the retaining wall 21 is greater than the farthest distance from the second sub-surface S12 to the retaining wall 21. Alternatively, the farthest distances from the first sub-surface S11 and the third sub-surface S14 to the retaining wall 21 may be different from each other. In addition, in the direction away from the optical film 6, at least one of a width of the first sub-surface S11 and a width of the third sub-surface S14 may be less than a width of the second sub-surface S12. In this way, the light irradiated to the bearing portion 22 and reflected to the human eyes may also be effectively reduced.

For example: with continued reference to FIG. 7, in some embodiments, the first sub-surface S11, the second sub-surface S12, and the third sub-surface S14 are sequentially disposed in the direction away from the optical film 6, and the farthest distance from each of the first sub-surface S11 and the third sub-surface S14 to the retaining wall 21 is greater than the farthest distance from the second sub-surface S12 to the retaining wall 21. The first sub-surface S11, the second sub-surface S12, and the third sub-surface S14 may be substantially parallel or parallel to the plane where the retaining wall 21 is located, and both the first connection sub-surface S13 and the second connection sub-surface S15 are parallel or substantially parallel to the plane where the optical film 6 is located. Alternatively, each of the first sub-surface S11, the second sub-surface S12, and the third sub-surface S14 may alternatively form a certain angle with the plane where the retaining wall 21 is located.

Figure 8:
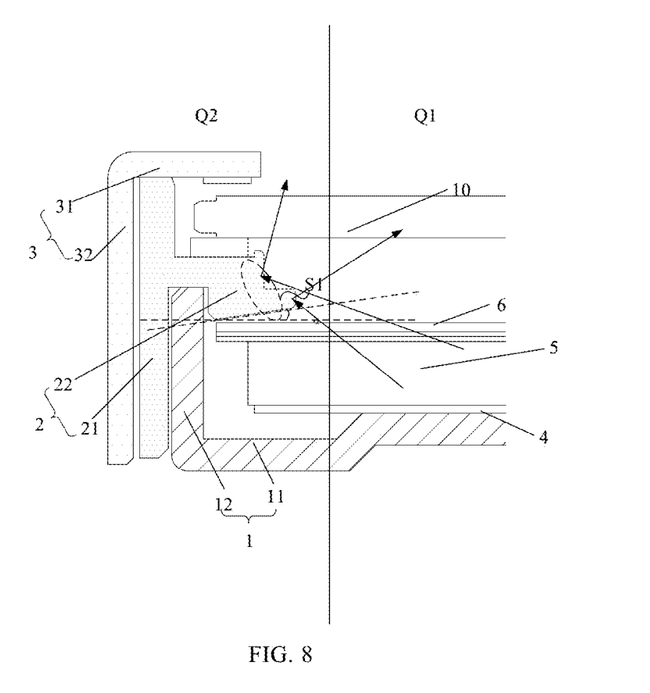
FIG. 8 is a schematic diagram of another structure of a backlight module and a display panel according to an embodiment of the present disclosure.

In another example, FIG. 8 is a schematic diagram of another structure of a backlight module and a display panel 10 according to an embodiment of the present disclosure. As shown in FIG. 8, the bearing portion 22 of the frame 2 includes not only the first surface S1 described above, but also a second surface that is adjacent to the optical film 6 and is disposed opposite to the optical film 6. An extending surface of the second surface of the bearing portion 22 and the plane where the optical film 6 is located have a dihedral angle therebetween, so that the width of the first sub-surface S1 in the direction away from the optical film 6 is as small as possible, to reduce the light reflected by the first surface S1 to the human eyes as much as possible. For example: the dihedral angle α between the extending surface of the second surface of the bearing portion 22 and the plane where the optical film 6 is located is less than 5°.

In some embodiments, a matte structure is formed on the first surface S1 of the bearing portion 22 of the plastic frame 2, that is, the first surface S1 is roughened, so that the specular reflection may be reduced, the diffuse reflection may be increased, and the light irradiated onto the first surface S1 may be consumed, so that the light reflected by the first surface S1 to the display panel 10 may be reduced.

The matte structure on the first surface S1 may be formed by performing a matte treatment on the first surface S1, or by attaching a matte film layer on the first surface S1.

In some embodiments, the bearing portion 22 of the plastic frame 2 and the retaining wall 21 may have a one-piece structure. For example: the plastic frame 2 is formed by injection molding.

With continued reference to FIG. 8, in some embodiments, a stiffener is formed on the bottom wall 11 of the backplane 1. In some embodiments, the stiffener on the bottom wall 11 of the backplane 1 is formed as a stiffener structure through a sheet metal process to increase the strength of the backplane 1. In some embodiments, the stiffener has a width in a range of 0.2 mm to 1.5 mm. For example: the width of the stiffener is 0.5 mm, 0.6 mm, 0.8 mm, 1.1 mm, 1.3 mm or the like. Alternatively, the stiffener may not be provided in some products. In an embodiment of the present disclosure, the width of the stiffener structure is not specifically limited, and may be specifically set according to the product requirement. With continued reference to FIG. 2, in some embodiments, the optical film 6 includes a diffuser, a prism sheet, or the like.

Figure 9:
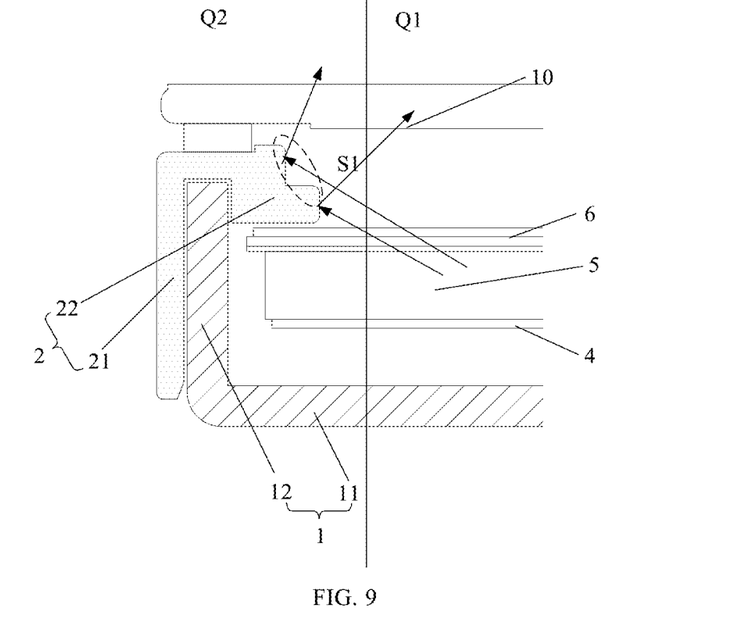
FIG. 9 is a schematic diagram of another structure of a backlight module and a display panel according to an embodiment of the present disclosure.

As shown in FIGS. 3, 4, 6, and 7, in some embodiments, the backlight module includes not only the above structure but also the outer frame 3; the outer frame 3 is disposed outside the plastic frame 2 and the display panel 10, and is used for fixing the display panel 10 and the plastic frame 2 together. For example: the outer frame 3 includes a front frame portion 31 on the display side of the display panel 10, and a side frame portion 32 provided side by side with the retaining wall 21 of the plastic frame 2. FIG. 9 is a schematic diagram of another structure of a backlight module and a display panel 10 according to an embodiment of the present disclosure. As shown in FIG. 9, the backlight module may not include the outer frame 3, which may further narrow the border of the display apparatus.

In a second aspect, an embodiment of the present disclosure provides a display apparatus, which includes the backlight module and the display panel 10. The display panel 10 is disposed on a side of the bearing portion 22 of the plastic frame 2 away from the optical film 6. The front frame portion 31 of the outer frame 3 is located on the display side of the display panel 10.

In the embodiments of the present disclosure, since the display apparatus adopts the backlight module, at least the portion of the first surface S1 of the bearing portion 22 of the plastic frame 2 of the backlight module protrudes towards the side close to the retaining wall 21, that is, compared to the related art, at least the portion of the first surface S1 may be moved close to a plane where the retaining wall 21 is located, so that the light reflected to the human eyes through the first surface S1 may be effectively reduced, and the dark shadow on the display screen in the peripheral region Q2 of the display apparatus may be effectively reduced, thereby improving the display effect of the display apparatus.

The display apparatus may be: any product or component with a display function, such as a liquid crystal panel, a mobile phone, a tablet computer, a television, a monitor, a notebook computer, a digital photo frame, a navigator and the like.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A backlight module, comprising:

a backplane comprising a bottom wall and a side wall; wherein the bottom wall and the side wall are connected to each other to define an accommodating portion of the backplane;

a light guide plate in the accommodating portion;

an optical film on a side of the light guide plate away from the bottom wall; and a plastic frame comprising a retaining wall and a bearing portion; wherein the retaining wall is arranged side by side with the side wall and on a side of the side wall away from the light guide plate; the bearing portion is connected to the retaining wall and is on a side of the side wall and the optical film away from the bottom wall; wherein the bearing portion comprises a first surface away from the side wall and opposite to the retaining wall; at least a portion of the first surface protrudes towards a side close to the retaining wall;

wherein the at least a portion of the first surface comprises a first sub-surface and a second sub-surface opposite to the retaining wall, and a first connection sub-surface connecting the first sub-surface and the second sub-surface together;

the first sub-surface and the second sub-surface are sequentially arranged in a direction away from the optical film, and a farthest distance between the first sub-surface and the retaining wall is different from a farthest distance between the second sub-surface and the retaining wall; and the first sub-surface and the second sub-surface are substantially parallel to a plane where the retaining wall is located; and the first connection sub-surface is substantially parallel to a plane where the optical film is located.

2. The backlight module according to claim 1, wherein a width of the first sub-surface is less than a width of the second sub-surface in the direction away from the optical film.

3. The backlight module according to claim 1, wherein the farthest distance between the first sub-surface and the retaining wall is greater than the farthest distance between the second sub-surface and the retaining wall.

4. The backlight module according to claim 1, wherein the at least a portion of the first surface further comprises a third sub-surface opposite to the retaining wall, and a second connection sub-surface connecting the second sub-surface and the third sub-surface together;

the first sub-surface, the second sub-surface, and the third sub-surface are sequentially arranged in a direction away from the optical film; and a farthest distance between the first sub-surface and the retaining wall, a farthest distance between the second sub-surface and the retaining wall, and a farthest distance between the third sub-surface and the retaining wall are different from each other; and the first sub-surface, the second sub-surface and the third sub-surface are substantially parallel to the plane where the remaining wall is located, and the second connection sub-surface is substantially parallel to the plane where the optical film is located.

5. The backlight module according to claim 4, wherein at least one of the farthest distance between the first sub-surface and the retaining wall and the farthest distance between the third sub-surface and the retaining wall is greater than the farthest distance between the second sub-surface and the retaining wall.

6. The backlight module according to claim 4, wherein at least one of the first sub-surface and the third sub-surface has a width less than a width of the second sub-surface in the direction away from the optical film.

7. The backlight module according to claim 1, wherein the first surface has a height of not less than 0.8 mm in the direction away from the optical film.

8. The backlight module according to claim 1, wherein the bearing portion comprises a second surface opposite to the optical film, and an extending surface of the second surface and a plane where the optical film is located have a dihedral angle therebetween.

9. The backlight module according to claim 8, wherein the dihedral angle is not greater than 5°.

10. The backlight module according to claim 1, wherein the first surface comprises a matte structure thereon.

11. The backlight module according to claim 1, wherein the first surface comprises a concave surface protruding towards a side close to the retaining wall in a circle.

12. The backlight module according to claim 1, wherein the backlight module further comprises a reflector in the accommodating portion and on a side of the light guide plate away from the optical film.

13. The backlight module according to claim 1, wherein the bottom wall has a stiffener thereon, and the stiffener has a width in a range of 0.2 mm to 1.5 mm.

14. The backlight module according to claim 1, wherein the first surface comprises at least one of a step surface, a groove surface, a wave surface.

15. A display apparatus, comprising the backlight module according to claim 1; and a display panel on the bearing portion.

16. The display apparatus according to claim 15, wherein the display apparatus comprises a display region, and a distance from the retaining wall to a boundary of the display region is not greater than 7 mm.

* * * * *